Feb. 7, 1956   C. S. KNOWLTON   2,734,164
CURRENT SUPPLY REGULATING APPARATUS
Filed Sept. 22, 1953
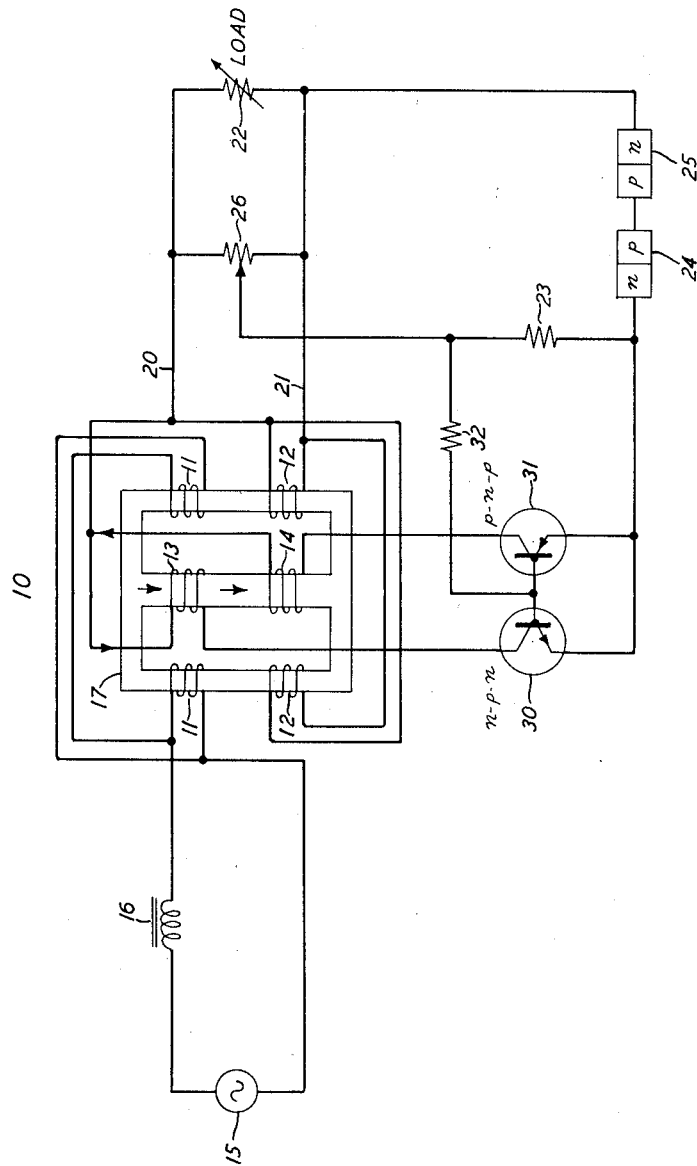
INVENTOR
C. S. KNOWLTON
BY
*G. F. Heuerman*
ATTORNEY › # United States Patent Office

2,734,164
Patented Feb. 7, 1956

2,734,164
CURRENT SUPPLY REGULATING APPARATUS

Clarence Stuart Knowlton, Springfield, N. J., assignor to Bell Telephone Laboratories, Incorporated, New York, N. Y., a corporation of New York Application September 22, 1953, Serial No. 381,669

10 Claims. (Cl. 323—56)

This invention relates to current supply apparatus and particularly to apparatus for supplying alternating current from a supply source to a load circuit and for minimizing changes of the alternating voltage across the load circuit.

An object of the invention is to provide an improved alternating line voltage regulator.

In a specific embodiment of the invention herein shown and described for the purpose of illustration, there is provided a saturable transformer having a primary which is connected through an inductive reactor to an alternating-current supply source and having a secondary which is connected to a load circuit. The transformer has two saturating windings to which are supplied unidirectional currents derived from the load circuit to minimize changes of the alternating voltage across the load circuit. A portion at least of the alternating load voltage is impressed across a current path comprising in series a resistor and two oppositely poled p-n junction devices such as are disclosed in an application of W. Shockley Serial No. 211,212 filed February 16, 1951. There are provided an n-p-n type transistor and a p-n-p type transistor each having a collector, an emitter and a base. During half-cycle periods of one polarity of the alternating current, current flows from the load circuit through one of the saturating windings into the collector and out of the emitter of the n-p-n transistor and through the p-n junction devices. During half-cycle periods of opposite polarity of the alternating current, current flows from the load circuit through the p-n junction devices into the emitter and out of the collector of the p-n-p transistor and through the other saturating winding. The saturating windings are oppositely wound on a portion of the transformer core so that the two unidirectional magnetomotive forces set up by the currents supplied to the saturating windings, respectively, are in the same direction. The magnitude of the currents supplied to the saturating windings is controlled in response to changes of the alternating load voltage by impressing the alternating voltage across the resistor upon the emitter-base paths of the two transistors. An increase of the alternating load voltage, for example, will cause an increase of the currents supplied to the saturating windings to increase the unidirectional saturating flux in the transformer core. The voltage across the primary winding and, therefore, the voltage across the secondary winding of the transformer, is thus reduced to minimize the assumed increase of voltage across the load circuit.

The invention will now be described with reference to the accompanying drawing, the single figure of which is a schematic view of an alternating-current supply apparatus embodying the invention.

Referring to the drawing, there is provided a saturable transformer 10 comprising a three-legged core 17 of magnetic material and a primary 11, a secondary 12 and saturating windings 13 and 14 on the core. The primary 11 has two equal parallel connected portions on the outer legs respectively of the core, the secondary 12 has two equal parallel connected portions on the outer legs respectively, and the saturating windings 13 and 14 are wound on the middle leg. Preferably, the saturating windings have equal turns and are wound in opposite directions. Current is supplied from an alternating-current supply source 15 through an inductive reactor 16 to the primary 11. The secondary 12 is connected to a load circuit 20, 21 which supplies current to a load 22 which may vary.

There is provided a current path comprising in series a resistor 23 and two oppositely poled p-n junction devices 24 and 25. A portion at least of the load circuit voltage is impressed across the current path. For this purpose a voltage divider such as the potentiometer 26 is connected across the load line 20, 21, the variable tap of the potentiometer 26 being connected to a terminal of resistor 23 and the line 21 being connected to a terminal of the p-n junction device 25.

As described in the application of W. Shockley, supra, a p-n junction device comprises an integral body of semi-conductive material, such as germanium or silicon, having two contiguous body portions of opposite conductivity types (one of p-type material, the other of n-type material) with a thin transition layer of material at the interface in which there is a progressive change or transition from the degree and type of conductivity characteristic of one body portion to the degree and type of conductivity characteristic of the other body portion. The device has a low resistance to current flow through it in the forward direction, that is, from the p portion to the n portion, while it has a high resistance to current flow through it in the reverse direction, that is, from the n portion to the p portion. If the reverse voltage applied to a rectifying p-n junction be increased to a sufficiently high value, a critical voltage is reached at which the current rapidly with further slight increase of voltage. Above the critical voltage, the voltage drop across the p-n junction device remains substantially constant over a wide range of current flowing through the device.

During a half-cycle period of the alternating load voltage when the line 20 is positive with respect to the potential of line 21, the voltage across the p-n junction device 25 due to current flowing through it in the forward direction is negligibly small. Current flows through the p-n junction device 24 in the reverse or high resistance direction. Therefore, the voltage across the device 24 will rise as the voltage across the load circuit rises until the critical voltage of the device 24 is reached. Then the current through the current path including the device 24 will increase and subsequently decrease over a wide current range while the load voltage increases to its peak value and then decreases. During this portion of the half-cycle the voltage across the device 24 remains substantially constant and the voltage across the resistor 23 rises and subsequently decreases in response to the relatively large change of current in the current path. During half-cycle periods of opposite polarity when the line 21 is positive with respect to the line 20, current flows in the opposite direction through the current path comprising the resistor 23 and the p-n junction devices 24 and 25. During these half-cycle periods, the voltage across the device 25 remains substantially constant over a large range of current through the device and the voltage across the resistor 23 rises to a peak value and then decreases in response to the large current change through the device 25. The amplitude of the flat-top alternating voltage across the devices 24 and 25, in series, is thus substantially constant irrespective of the amplitude changes of the alternating load voltage. However, the amplitude of the alternating voltage across the resistor 23 changes in response to an amplitude change of the alternating voltage across the load circuit and the percentage amplitude change of the alternating voltage across resistor 23 is larger than the percentage change of the alternating voltage across the load circuit.

There are provided two transistors 30 and 31 each having a collector, an emitter and a base. The transistor 30 is of the n-p-n type and the transistor 31 is of the p-n-p type. The emitters are conductively connected to a common terminal of resistor 23 and of the p-n junction device 24. The two bases are conductively connected through a resistor 32 to the terminal of resistor 23 which is connected to the variable tap of potentiometer 26. One terminal of saturating winding 13 and one terminal of saturating winding 14 are connected to the load line 20. The other terminal of winding 13 is connected to the collector of the transistor 30 and the other terminal of winding 14 is connected to the collector of transistor 31.

During half-cycle periods of one polarity of the alternating current, current flows from the load line 20 through winding 13 into the collector and out of the emitter of transistor 30 and through the p-n junction devices 24 and 25 to the load line 21. During half-cycle periods of opposite polarity, current flows from the load line 21 through the p-n junction devices 24 and 25 into the emitter and out of the collector of the transistor 31 and through the winding 14 to the load line 20. The windings 13 and 14 are oppositely wound on the middle leg of the transformer core 17 so that the currents rectified by the transistors 30 and 31 and supplied to the windings 13 and 14, respectively, set up magnetomotive forces in the middle leg of the core which are in the same direction, as indicated by the arrows in the drawing.

When the alternating voltage across the load circuit increases, for example, to cause the alternating voltage across the resistor 23 to increase, the pulsating current flowing into the base and out of the emitter of transistor 30 will increase to cause a much larger increase of the pulsating current flowing through the winding 13. Similarly, the pulsating current flowing into the emitter and out of the base of transistor 31 will increase to cause a much larger increase of the pulsating current flowing through the winding 14. The resulting unidirectional flux in the transformer core increases the saturation of the outer legs of the core on which the primary and secondary windings are wound. The voltage across the primary and the voltage across the secondary thus decrease, thereby minimizing the initially assumed increase of the alternating voltage across the load circuit 20, 21.

What is claimed is:

1. Apparatus for supplying alternating current from a supply source to a load circuit including a load comprising a saturable transformer having a first and a second saturating winding, a first transistor of the n-p-n type, a second transistor of the p-n-p type, each of said transistors having a collector, an emitter and a base, means for deriving from said load circuit and impressing between the base and emitter of each of said transistors an alternating voltage the amplitude of which varies in response to amplitude changes of the alternating load voltage, means for supplying current from said supply source through said first saturating winding and into the collector and out of the emitter of said first transistor during half-cycle periods of one polarity of said supply source and means for supplying current from said supply source into the emitter and out of the collector of said second transistor and through said second saturating winding during half-cycle periods of opposite polarity of said supply source.

2. Apparatus in accordance with claim 1 in which said saturable transformer comprises a primary winding and a secondary winding and in which there are provided means for connecting said secondary winding to said load circuit, an inductive reactor and means for connecting said primary winding and said reactor in series to said supply source.

3. Apparatus in accordance with claim 2 in which the currents through said saturating windings are supplied from said secondary transformer winding.

4. Apparatus in accordance with claim 1 in which said currents supplied to said saturating windings respectively set up in a magnetic circuit of the transformer unidirectional magnetomotive forces having the same direction.

5. Apparatus for supplying alternating current from a supply source to a load circuit including a load comprising a saturable transformer having a plurality of windings on a core of magnetic material including a first and a second saturating winding, a first transistor of the n-p-n type, a second transistor of the p-n-p type, each of said transistors having a collector, an emitter and a base, a first current path comprising in series a resistor and a constant voltage means, said constant voltage means having the characteristic that the voltage across it remains substantially constant irrespective of changes of current flowing therethrough over an operating range of current, means for impressing across said first current path a portion at least of the alternating voltage across said load circuit, means for conductively connecting the bases of said transistors, means for conductively connecting the emitters of said transistors, a circuit comprising said resistor connecting said paralleled base-emitter paths of said transistors, a second current path connected across said load circuit comprising in series said first saturating winding, the collector-emitter path of said first transistor and said constant voltage means and a third current path connected across said load circuit comprising in series said second saturating winding, the collector-emitter path of said second transistor and said constant voltage means.

6. Apparatus for supplying alternating current from a supply source to a load circuit comprising a saturable transformer having a core of magnetic material and saturating winding means on said core, a pair of transistors each having a collector, an emitter and a base, means for setting up a unidirectional magnetomotive force in said core comprising means including said transistors for supplying current from said load circuit to said winding means, a circuit connecting the emitter and base of each of said transistors and means for deriving from the load circuit and impressing upon said emitter-base circuits an alternating voltage which varies in response to changes of the alternating load voltage.

7. Apparatus for supplying alternating current from a supply source to a load circuit comprising a saturable transformer having a core of magnetic material and saturating winding means on said core, means for rectifying alternating current from said source and for supplying the rectified current to said winding means to set up a unidirectional magnetomotive force in said core, said last-mentioned means comprising a pair of transistors each having a collector, an emitter and a base, a circuit connecting the emitter and base of each of said transistors and means for deriving from said load circuit and impressing upon said emitter-base circuit an alternating voltage for controlling the magnitude of said unidirectional magnetomotive force to thereby minimize changes of the alternating voltage across said load circuit.

8. Apparatus for supplying alternating current from a supply source to a load circuit comprising an inductive reactor, a transformer having a primary, a secondary and saturating winding means all on a core of magnetic material, said load circuit being connected to said secondary, means for supplying alternating current from said source through said reactor to said primary, means for rectifying current from said load circuit and for supplying the rectified current to said winding means to set up a unidirectional magnetomotive force in said core, said last-mentioned means comprising a pair of transistors each having a collector, an emitter and a base, one of said transistors being of the p-n-p type and the other transistor being of the n-p-n type, a circuit connecting the emitter and base of each of said transistors and means for minimizing changes of the alternating voltage across load circuit comprising means for deriving from the load circuit and impressing upon said emitter-base circuits an alternating voltage for controlling the magnitude of said unidirectional magnetomotive force.

9. Apparatus for supplying alternating current from a supply source to a load circuit comprising saturable inductive means having a core of magnetic material and windings on said core including a plurality of saturating windings, means for setting up in said core a unidirectional magnetomotive force comprising means including a plurality of transistors for rectifying currents from said source and for supplying the rectified currents to said saturating windings respectively, and means for controlling the magnitudes of said rectified currents to thereby control the magnitude of said unidirectional magnetomotive force, said last-mentioned means comprising a circuit connecting the emitter and base of each of said transistors and means for impressing upon said emitter-base circuits an alternating voltage derived from said load circuit.

10. In combination, a saturable transformer having a core of magnetic material, a primary, a secondary and a first and a second saturating winding, an inductive reactor, means for connecting said primary through said reactor to a supply source of alternating current, means for connecting said secondary to a load circuit, a first and a second p-n junction device, a first resistor, a current path comprising in series said first resistor and said first and second p-n junction devices oppositely poled with respect to each other, means for impressing upon said current path a portion at least of the alternating voltage across said load circuit, a first of said p-n junction devices having a terminal connected to one side of said load circuit, two transistors each having a collector, an emitter and a base, a first of said transistors being of the n-p-n type, the second of said transistors being of the p-n-p type, means for connecting the emitters of said transistors to a common terminal of said first resistor and of the second of said p-n junction devices, a second resistor, means comprising said second resistor for connecting the bases of said transistors to the other terminal of said first resistor, means for connecting a first terminal of each of said saturating windings to the other side of said load circuit, means for connecting the second terminal of said first saturating winding to the collector of said n-p-n transistor and means for connecting the second terminal of said second saturating winding to the collector of said p-n-p transistor, said saturating windings being oppositely wound on a portion of said core so as to set up in said core unidirectional magnetomotive forces which are in the same direction.

References Cited in the file of this patent

UNITED STATES PATENTS 2,555,544    Holt et al. _____ June 5, 1951